US012640462B2

(12) United States Patent
Wu et al.

(10) Patent No.: US 12,640,462 B2
(45) Date of Patent: May 26, 2026

(54) ELECTRONIC DEVICE

(71) Applicant: Getac Technology Corporation, New Taipei City (TW)

(72) Inventors: Shao-Ching Wu, Taipei City (TW); Shang-Yi Yang, Taipei City (TW)

(73) Assignee: Getac Technology Corporation, New Taipei City (TW)

( * ) Notice: Subject to any disclaimer, the term of this patent is extended or adjusted under 35 U.S.C. 154(b) by 72 days.

(21) Appl. No.: 18/733,004

(22) Filed: Jun. 4, 2024

(65) Prior Publication Data

US 2025/0167430 A1 May 22, 2025

(30) Foreign Application Priority Data

Nov. 20, 2023 (CN) ........................ 202311548679.3

(51) Int. Cl.
*H01Q 1/24* (2006.01)
*H01Q 1/38* (2006.01)
*H01Q 21/28* (2006.01)

(52) U.S. Cl.
CPC ............... *H01Q 1/243* (2013.01); *H01Q 1/38* (2013.01); *H01Q 21/28* (2013.01)

(58) Field of Classification Search
CPC ............ H01Q 1/22; H01Q 1/24; H01Q 1/243; H01Q 1/36; H01Q 1/38; H01Q 5/20; H01Q 21/00; H01Q 21/28
See application file for complete search history.

(56) References Cited

U.S. PATENT DOCUMENTS 9,871,330 B2 1/2018 Seo et al.
2018/0241115 A1* 8/2018 Cho ........................ H01Q 1/36

FOREIGN PATENT DOCUMENTS

| | | | |
|---|---|---|---|
| CN | 201425967 | Y | 3/2010 |
| CN | 102723573 | A | 10/2012 |
| CN | 208521220 | U | 2/2019 |
| CN | 212115385 | A | 12/2020 |
| CN | 216792712 | U | 6/2022 |
| CN | 116666937 | A | 8/2023 |
| CN | 220018596 | U | 11/2023 |

* cited by examiner

*Primary Examiner* — Hoang V Nguyen
(74) *Attorney, Agent, or Firm* — COOPER LEGAL GROUP LLC

(57) ABSTRACT

An electronic device includes a housing, a metal support plate, a three-dimensional antenna bracket and a side button circuit board. The housing includes an upper housing body and a lower housing body. The metal support plate is arranged in the housing. The three-dimensional antenna bracket is arranged in a first space between the metal support plate and the lower housing body. The side button circuit board is arranged in a second space between the metal support plate and the upper housing body. The area of the three-dimensional antenna bracket and the area of the side button circuit board on the metal support plate overlap with each other. Thus, the electronic device can meet the design requirement for a plurality of antennae, and the three-dimensional antenna bracket and the metal support plate form a radiation cavity to resonate to generate a target antenna frequency band and an available radiation pattern.

20 Claims, 5 Drawing Sheets

ELECTRONIC DEVICE

CROSS-REFERENCE TO RELATED APPLICATION

The instant application claims priority to China Patent Application 202311548679.3, filed Nov. 20, 2023, which is incorporated herein by reference.

FIELD OF THE INVENTION

The present invention relates to an electronic device, and more particularly to a multi-antenna electronic device.

BACKGROUND OF THE INVENTION

Peripheral mechanism spaces of tablet PC type electronic devices are too small and can hardly meet the design manner of multi-antenna communication systems in consideration with the requirements for cost reduction/detachable antennae, etc. Therefore, how to add new antennae in the limited peripheral mechanism spaces is an important issue to be solved in this technical field.

SUMMARY OF THE INVENTION

The present invention provides an electronic device, which can break through the space limitation, form a metal cavity and resonate to generate a target antenna frequency band and an available radiation pattern by means of a space between side buttons and a housing through a special design, and meet the design of a multi-antenna communication system at the same time.

The electronic device provided in the present invention comprises a housing, a metal support plate, a three-dimensional antenna bracket and a side button circuit board, where the housing comprises an upper housing body and a lower housing body; the metal support plate is arranged in the housing; the three-dimensional antenna bracket is arranged in a first space between the metal support plate and the lower housing body; the side button circuit board is arranged in a second space between the metal support plate and the upper housing body; and the area of the three-dimensional antenna bracket and the area of the side button circuit board on the metal support plate partially overlap with each other.

The electronic device provided in the present invention comprises a housing, a metal support plate, a three-dimensional antenna bracket and a side button circuit board, where the housing comprises an upper housing body and a lower housing body; the metal support plate is arranged in the housing; the three-dimensional antenna bracket is arranged in a first space between the metal support plate and the lower housing body; the side button circuit board is arranged in a second space between the metal support plate and the upper housing body; and the area of the three-dimensional antenna bracket and the area of the side button circuit board on the metal support plate completely overlap with each other.

In an embodiment of the present invention, the upper housing body comprises a display frame, and the display frame is configured to fixedly arrange a display panel.

In an embodiment of the present invention, the upper housing body comprises a side button frame, and the side button frame is configured to fixedly arrange the side button circuit board.

In an embodiment of the present invention, the metal support plate, relative to a plane of the metal support plate, comprises a protruding portion in the second space, and the protruding portion is configured to abut against the side button circuit board.

In an embodiment of the present invention, the metal support plate, relative to a plane of the metal support plate, comprises a concave portion and a metal wall in the first space, and the concave portion and the metal wall are configured to fixedly arrange the three-dimensional antenna bracket.

In an embodiment of the present invention, the three-dimensional antenna bracket comprises at least one hollow portion facing the metal support plate.

In an embodiment of the present invention, the metal support plate comprises at least one opening facing the three-dimensional antenna bracket, and the at least one opening corresponds to the at least one hollow portion.

In an embodiment of the present invention, the three-dimensional antenna bracket comprises a soft-board antenna facing the lower housing body.

With regard to the electronic device, by means of the spaces between side buttons and the housing, the three-dimensional antenna bracket and the metal support plate form a radiation cavity to resonate to generate a target antenna frequency band and an available radiation pattern, and meanwhile, the electronic device can meet the multi-antenna design requirement.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF PREFERRED EMBODIMENTS

Figure 1:
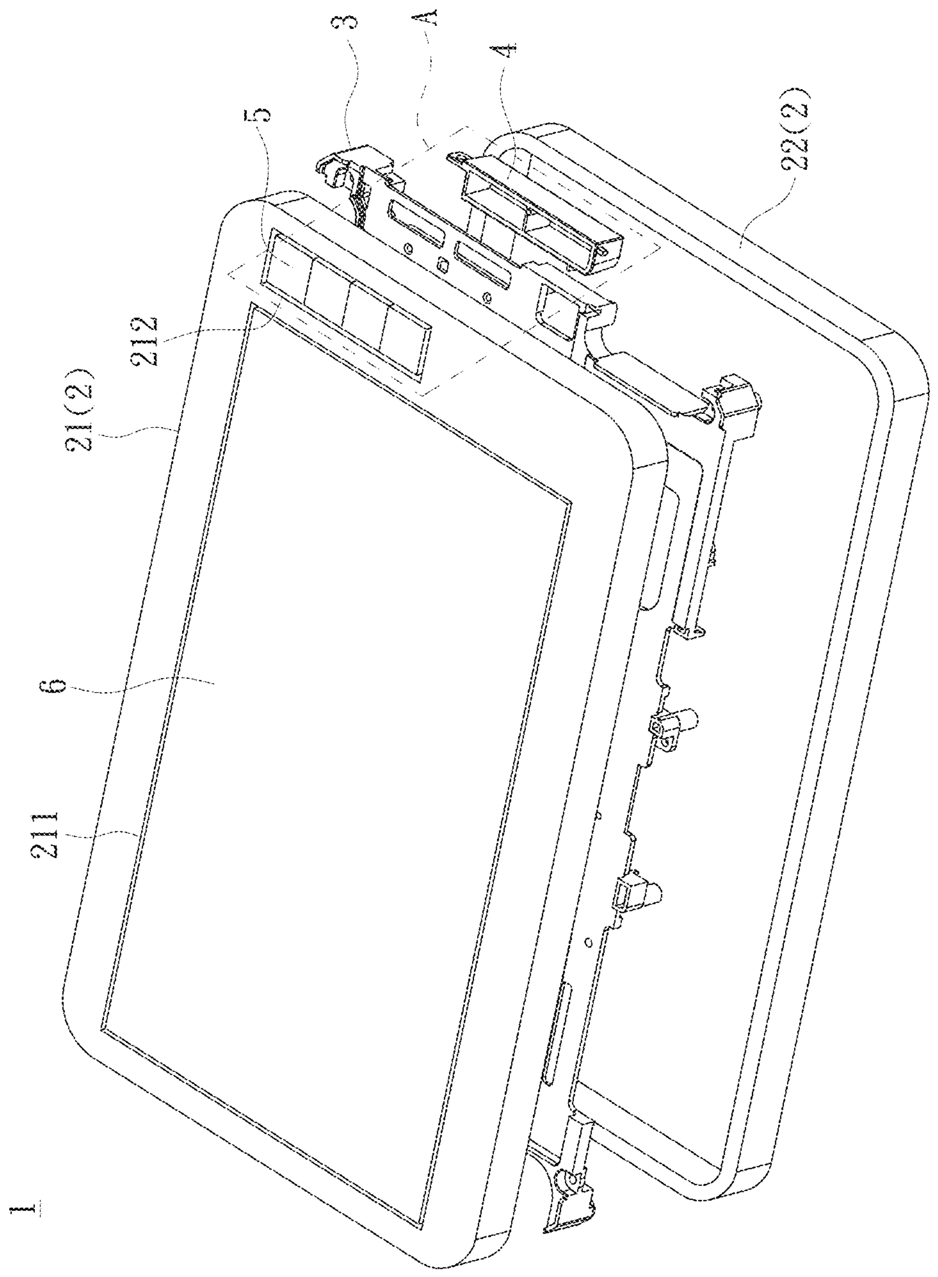
FIG. 1 is an exploded schematic diagram of an electronic device provided in an embodiment of the present invention.
Figure 2:
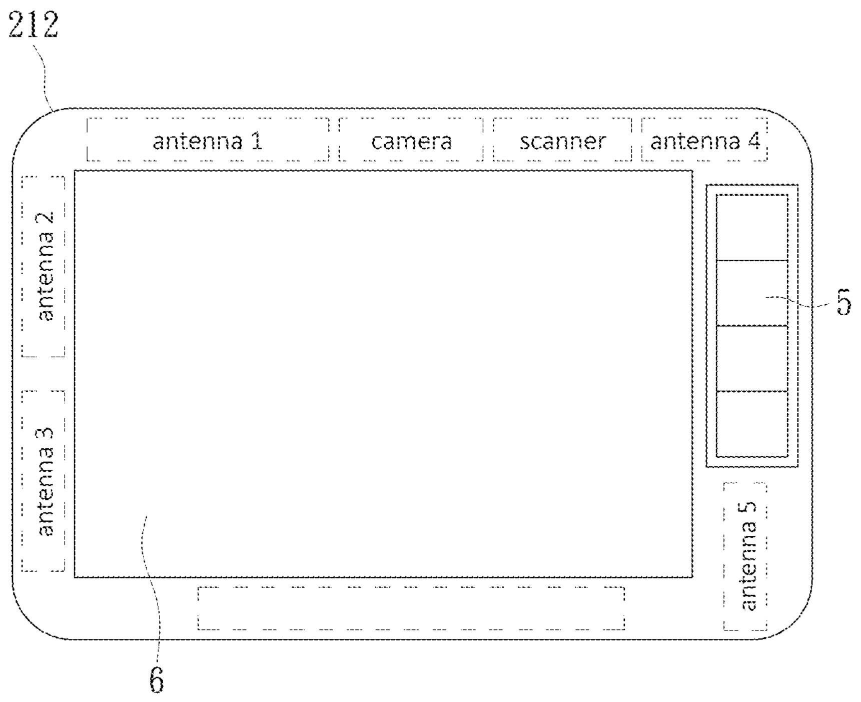
FIG. 2 is a front perspective view of an electronic device provided in an embodiment of the present invention.
Figure 3:
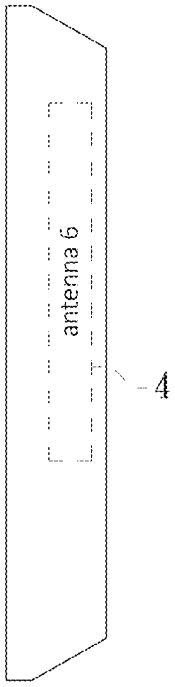
FIG. 3 is a side schematic diagram of side buttons of an electronic device provided in an embodiment of the present invention.
Figure 4:
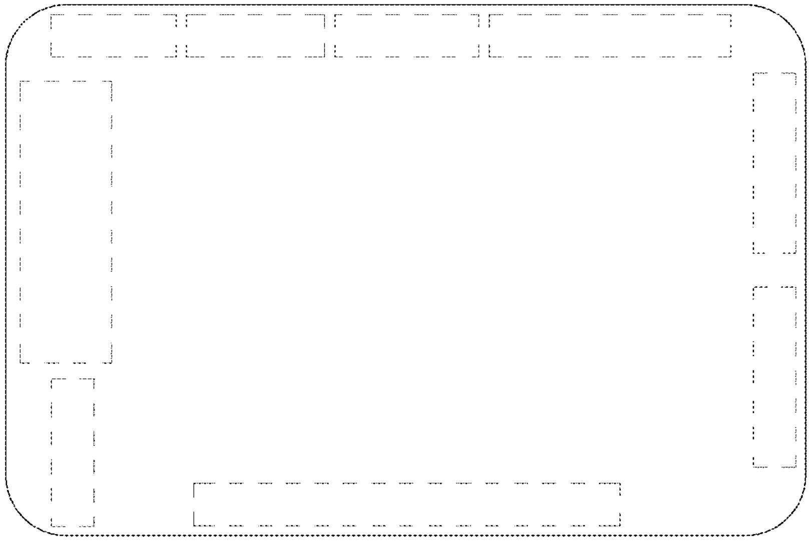
FIG. 4 is a back perspective view of an electronic device provided in an embodiment of the present invention.

In order to make the purposes, technical solutions and advantages of the present invention more clear, the present invention is further described in detail in conjunction with accompanying drawings and embodiments below. It should be understood that the specific embodiments described herein are only used to explain the present invention, not to define the present invention. On the basis of the embodiments of the present invention, all other embodiments obtained by those of ordinary skill in the pertinent technical field without involving any inventive effort should fall within the scope of protection of the present invention.

Reference is made to FIGS. 1-4, which are an exploded schematic diagram of an electronic device provided in an embodiment of the present invention, a front perspective view of an electronic device provided in an embodiment of the present invention, a side schematic diagram of side buttons of an electronic device provided in an embodiment of the present invention, and a back perspective view of an electronic device provided in an embodiment of the present invention, respectively. The electronic device 1 provided in this embodiment includes a housing 2, a metal support plate 3, a three-dimensional antenna bracket 4 (located at the position of an antenna 6), and a side button circuit board 5. The electronic device 1 is a tablet PC, and more particularly a reinforced tablet PC. The housing 2 of the electronic device 1 includes an upper housing body 21 and a lower housing body 22, where the upper housing body 21 includes a display frame 211 and a side button frame 212, the display frame 211 is configured to fixedly arrange a (touchable) display panel 6, and the side button frame 212 is configured to fixedly arrange the side button circuit board 5. In addition, the upper housing body 21 and the lower housing body 22 of the housing 2 are only intended to explain an upper/top portion and a lower/bottom portion of the housing 2, not to define the structure and combination of the housing 2, for example, the housing can be integrally formed. The metal support plate 3 is arranged in the housing 2 and is configured to reinforce the structure of the electronic device 1, and a system circuit board (not shown) can be arranged at the front or back of the metal support plate 3 and be connected to the display panel 6 by means of a transmission flat cable. Besides, edges of the metal support plate 3 can be cut and punched according to the shapes of peripheral mechanisms such as modules, devices, circuits, for example, antenna modules, camera modules, scanning modules, etc., due to the arrangement of these mechanisms. It should be particularly noted that the present invention focuses on the (overlapping) relationship of the side button circuit board 5, the metal support plate 3 and the three-dimensional antenna bracket 4.

Figure 5:
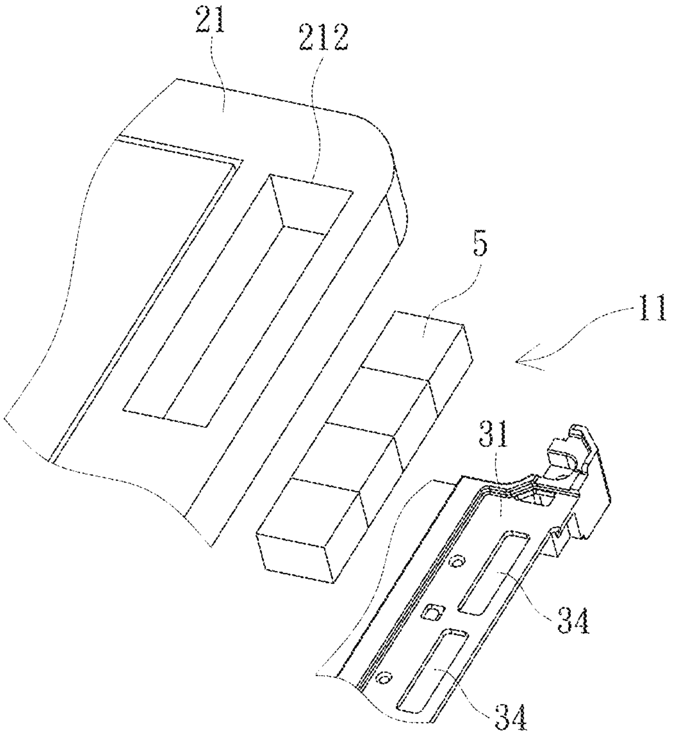
FIG. 5 is a top schematic diagram of an area A in FIG. 1.
Figure 6:
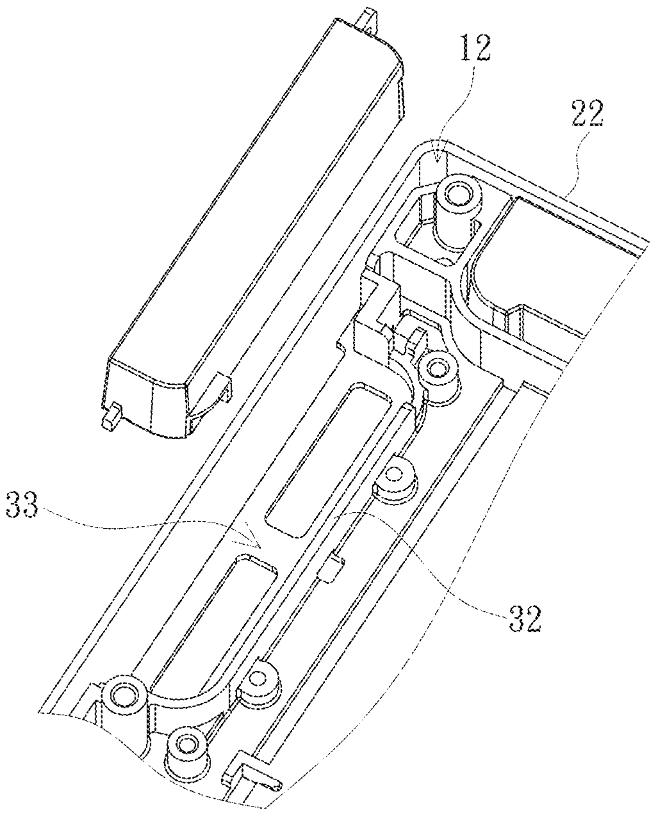
FIG. 6 is a bottom schematic diagram of the area A in FIG. 1.

Reference is made to FIGS. 5 and 6, which are a top schematic diagram and a bottom schematic diagram of an area A in FIG. 1, respectively. In FIG. 5, the side button circuit board 5 is arranged in a space 11 between the metal support plate 3 and the upper housing body 21, where the metal support plate 3, relative to a plane of the metal support plate 3, includes a protruding portion 31 in the space 11, and the protruding portion 31 is configured to abut against the side button circuit board 5, so as to ensure that the side button circuit board 5 is fixedly arranged in the side button frame 212. In FIG. 6, the three-dimensional antenna bracket 4 is arranged in a space 12 between the metal support plate 3 and the lower housing body 22, where the metal support plate 3, relative to a plane of the metal support plate 3, includes a concave portion 33 and a metal wall 32 in the space 12, and the metal wall 32 and the concave portion 33 are configured to fixedly arrange the three-dimensional antenna bracket 4, so as to ensure that the three-dimensional antenna bracket 4 is fixedly arranged in the space 12. It should be noted that the protruding shape and the concave shape of the protruding portion 31 and the concave portion 33 represent the relative relationship instead of defining a protrusion or a recess. Besides, it should be particularly noted that, in this embodiment, the three-dimensional antenna bracket 4 and the side button circuit board 5 are correspondingly arranged across the metal support plate 3, and the area of the three-dimensional antenna bracket 4 and the area of the side button circuit board 5 on the metal support plate 3 completely overlap with each other. Moreover, in other embodiments, the area of the three-dimensional antenna bracket 4 and the area of the side button circuit board 5 on the metal support plate 3 can partially overlap with each other. In addition, the metal support plate 3 can include at least one opening 34 facing the three-dimensional antenna bracket 4 or include no opening 34; in this embodiment, the metal support plate 3 includes two openings 34 for preventing electronic components at the back of the side button circuit board 5 from making contact with the metal support plate 3 due to their heights; and in other embodiments, the metal support plate 3 can include a plurality of openings 34.

Figure 7:
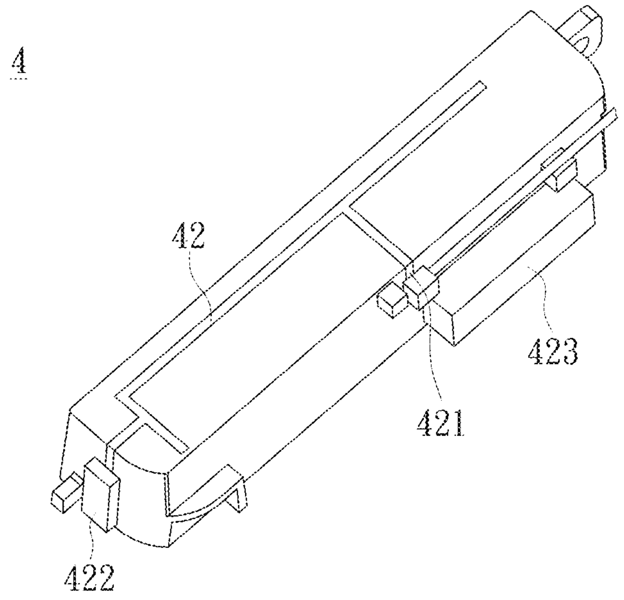
FIG. 7 is a top schematic diagram of a three-dimensional antenna bracket provided in an embodiment of the present invention.
Figure 8:
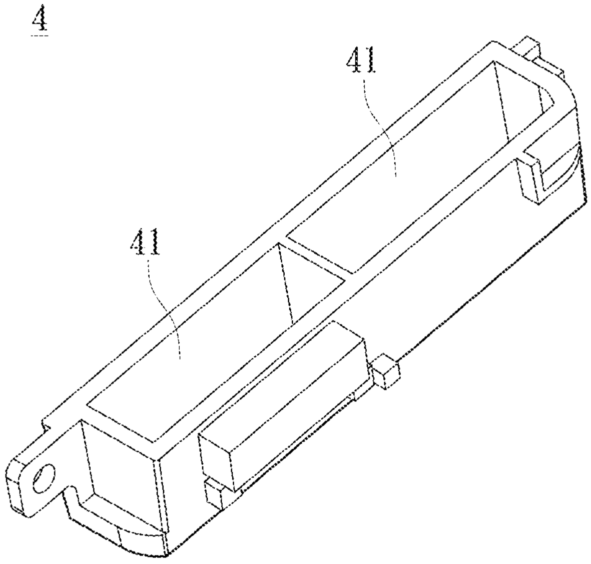
FIG. 8 is a bottom schematic diagram of a three-dimensional antenna bracket provided in an embodiment of the present invention.

Reference is made to FIGS. 7 and 8, which are a top schematic diagram and a bottom schematic diagram of the three-dimensional antenna bracket provided in an embodiment of the present invention, respectively. In FIG. 7, the surface of the three-dimensional antenna bracket 4 provided in this embodiment facing the lower housing body 22 and the metal wall 32 is configured to provide a soft-board antenna 42, where the soft-board antenna 42 includes a feed-in point 421 and grounding points 422, 423, and the shape of the soft-board antenna 42 in this figure is only for illustration. A person skilled in the antenna field can design the shape of the antenna according to actual needs, and the present invention is not limited to this. In FIG. 8, the surface of the three-dimensional antenna bracket 4 provided in this embodiment facing the metal support plate 3 includes at least one hollow portion 41 to form a radiation cavity, for example, the three-dimensional antenna bracket 4 includes two hollow portions 41 which can correspond to the two openings 34 of the metal support plate 3 or do not correspond to the two openings 34 of the metal support plate 3; in other embodiments, the three-dimensional antenna bracket 4 can include no hollow portion 41 or include a plurality of hollow portions 41; and in other embodiments, the hollow portions 41 of the three-dimensional antenna bracket 4 and the openings 34 of the metal support plate 3 can be identical or different in number, thereby corresponding or not corresponding to each other.

In conclusion, with regard to the electronic device provided in the present invention, by means of the spaces between side buttons and the housing, the three-dimensional antenna bracket and the metal support plate form the radiation cavity to resonate to generate a target antenna frequency band and an available radiation pattern, and meanwhile, the electronic device can meet the multi-antenna design requirement.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An electronic device, comprising:

a housing, comprising an upper housing body and a lower housing body;

a metal support plate, arranged in the housing;

a three-dimensional antenna bracket, arranged in a first space between the metal support plate and the lower housing body; and a side button circuit board, arranged in a second space between the metal support plate and the upper housing body, wherein an area of the three-dimensional antenna bracket and an area of the side button circuit board on the metal support plate partially overlap with each other, and wherein the metal support plate, relative to a plane of the metal support plate, comprises a protruding portion in the second space, and the protruding portion is configured to abut against the side button circuit board.

2. The electronic device according to claim 1, wherein the upper housing body comprises a display frame, and the display frame is configured to fixedly arrange a display panel.

3. The electronic device according to claim 1, wherein the upper housing body comprises a side button frame, and the side button frame is configured to fixedly arrange the side button circuit board.

4. The electronic device according to claim 1, wherein the metal support plate, relative to the plane of the metal support plate, comprises a concave portion and a metal wall in the first space, and the concave portion and the metal wall are configured to fixedly arrange the three-dimensional antenna bracket.

5. The electronic device according to claim 1, wherein the three-dimensional antenna bracket comprises at least one hollow portion facing the metal support plate.

6. The electronic device according to claim 5, wherein the metal support plate comprises at least one opening facing the three-dimensional antenna bracket, and the at least one opening corresponds to the at least one hollow portion.

7. The electronic device according to claim 1, wherein the three-dimensional antenna bracket comprises a soft-board antenna facing the lower housing body.

8. An electronic device, comprising:

a housing, comprising an upper housing body and a lower housing body;

a metal support plate, arranged in the housing;

a three-dimensional antenna bracket, arranged in a first space between the metal support plate and the lower housing body; and a side button circuit board, arranged in a second space between the metal support plate and the upper housing body, wherein an area of the three-dimensional antenna bracket and an area of the side button circuit board on the metal support plate completely overlap with each other, and wherein the metal support plate, relative to a plane of the metal support plate, comprises a protruding portion in the second space, and the protruding portion is configured to abut against the side button circuit board.

9. The electronic device according to claim 8, wherein the upper housing body comprises a display frame, and the display frame is configured to fixedly arrange a display panel.

10. The electronic device according to claim 8, wherein the upper housing body comprises a side button frame, and the side button frame is configured to fixedly arrange the side button circuit board.

11. The electronic device according to claim 8, wherein the metal support plate, relative to the plane of the metal support plate, comprises a concave portion and a metal wall in the first space, and the concave portion and the metal wall are configured to fixedly arrange the three-dimensional antenna bracket.

12. The electronic device according to claim 8, wherein the three-dimensional antenna bracket comprises at least one hollow portion facing the metal support plate.

13. The electronic device according to claim 12, wherein the metal support plate comprises at least one opening facing the three-dimensional antenna bracket, and the at least one opening corresponds to the at least one hollow portion.

14. The electronic device according to claim 8, wherein the three-dimensional antenna bracket comprises a soft-board antenna facing the lower housing body.

15. An electronic device, comprising:

a housing, comprising an upper housing body and a lower housing body;

a metal support plate, arranged in the housing;

a three-dimensional antenna bracket, arranged in a first space between the metal support plate and the lower housing body; and a side button circuit board, arranged in a second space between the metal support plate and the upper housing body, wherein an area of the three-dimensional antenna bracket and an area of the side button circuit board on the metal support plate at least partially overlap with each other, and wherein the metal support plate, relative to a plane of the metal support plate, comprises a concave portion and a metal wall in the first space, and the concave portion and the metal wall are configured to fixedly arrange the three-dimensional antenna bracket.

16. The electronic device according to claim 15, wherein the upper housing body comprises a display frame, and the display frame is configured to fixedly arrange a display panel.

17. The electronic device according to claim 15, wherein the upper housing body comprises a side button frame, and the side button frame is configured to fixedly arrange the side button circuit board.

18. The electronic device according to claim 15, wherein the three-dimensional antenna bracket comprises at least one hollow portion facing the metal support plate.

19. The electronic device according to claim 18, wherein the metal support plate comprises at least one opening facing the three-dimensional antenna bracket, and the at least one opening corresponds to the at least one hollow portion.

20. The electronic device according to claim 15, wherein the three-dimensional antenna bracket comprises a soft-board antenna facing the lower housing body.

* * * * *